T 859,004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 41

661,820

AQUEOUS DYE BATH CONTAINING A HIGH MOLECULAR WEIGHT QUATERNARY AMMONIUM SALT AND AN ETHYLENE OXIDE CONDENSATE OF 8 TO 12 CARBON ALIPHATIC ALCOHOL AND NYLON DYEING AND ELECTROSTATIC CHARGE REDUCTION THEREWITH

Joseph Aloysius Brooks, Wilmington, Del., assignor to E. I. du Pont de Nemours and Company, Wilmington, Del., a corporation of Delaware

Filed Aug. 21, 1967. Published Feb. 4, 1969

Class 8—17

No Drawing. 17 Pages Specification

A process of dyeing and simultaneously imparting durable antistatic protection to synthetic polycarbonamide material by dyeing the polycarbonamide material in an aqueous dye bath which contains in percent by weight of the material to be dyed (1) from 0.05 to 5.0% of a dyestuff for said material, (2) from about 0.1 to 0.5% of a non-ionic surfactant which is a condensation product of a long-chain aliphatic alcohol containing from 8 to 18 carbon atoms with from 10 to 25 molar equivalents of ethylene oxide, (3) from about 0.25 to 1% of a cationic surfactant consisting of a high molecular weight aliphatic quaternary ammonium salt and (4) from about 0.4 to 2% of an anionic surfactant consisting of a disulfonate salt of an alkyl diphenyl ether, the weight of the anionic surfactant being at least 50% greater than that of the cationic surfactant, and the pH of the dyeing bath being from about 4 to 6. The preferred non-ionic surfactant is the condensation product of a branched chain, 10-carbon oxo alcohol with about 15 molar equivalents of ethylene oxide. A specific anionic surfactant is a 4-dodecyl-2,4′-di(sodium sulfonato)-diphenyl ether. A useful cationic surfactant is a high molecular weight, straight-chain quaternary ammonium salt, i.e., dimethyl-distearyl-quaternary ammonium chloride.

In an example, nylon fibers modified by poly (ethylene oxide), m.w. 20,000, dispersed in the fibers are bulked for use in carpets, caused to have voids therein by aqueous processing extracting the polyethylene-oxide particles and are dyed at 180° to 250° F. in an acid, pH 4 to 6, dye bath containing the latter quaternary ammonium compound and alkyl diphenyl ether disulfonate as well as acid, metallized azo and neutral-dyeing premetallized acid of the 2:1 azo dye:metal atom type. The carpet so dyed has antistatic protection, unaffected appearance, tactile aesthetics and soil resistance.